Jan. 22, 1952 K. KOON 2,583,179
RECORD SENSING MEANS
Filed June 8, 1950 2 SHEETS—SHEET 1
FIG. 1
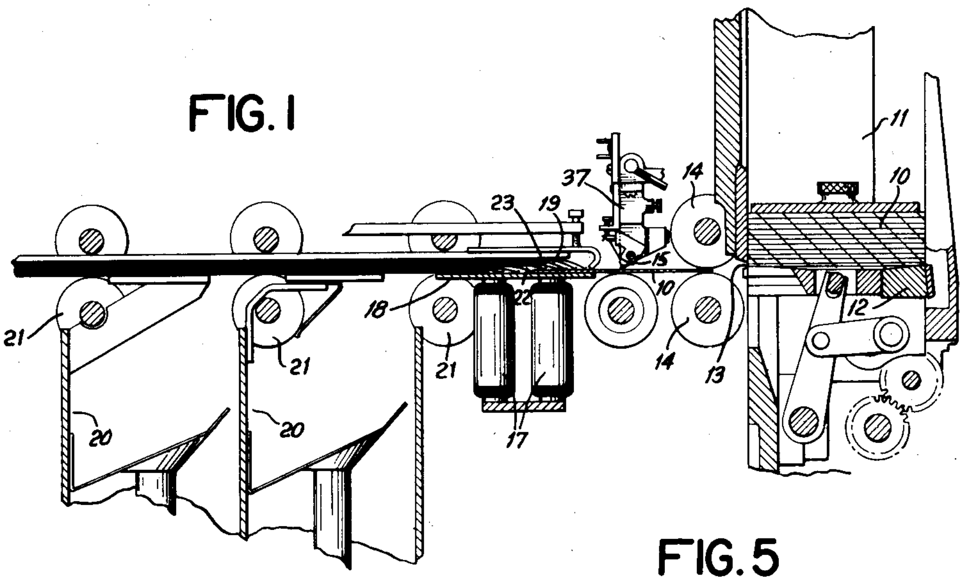
FIG. 5
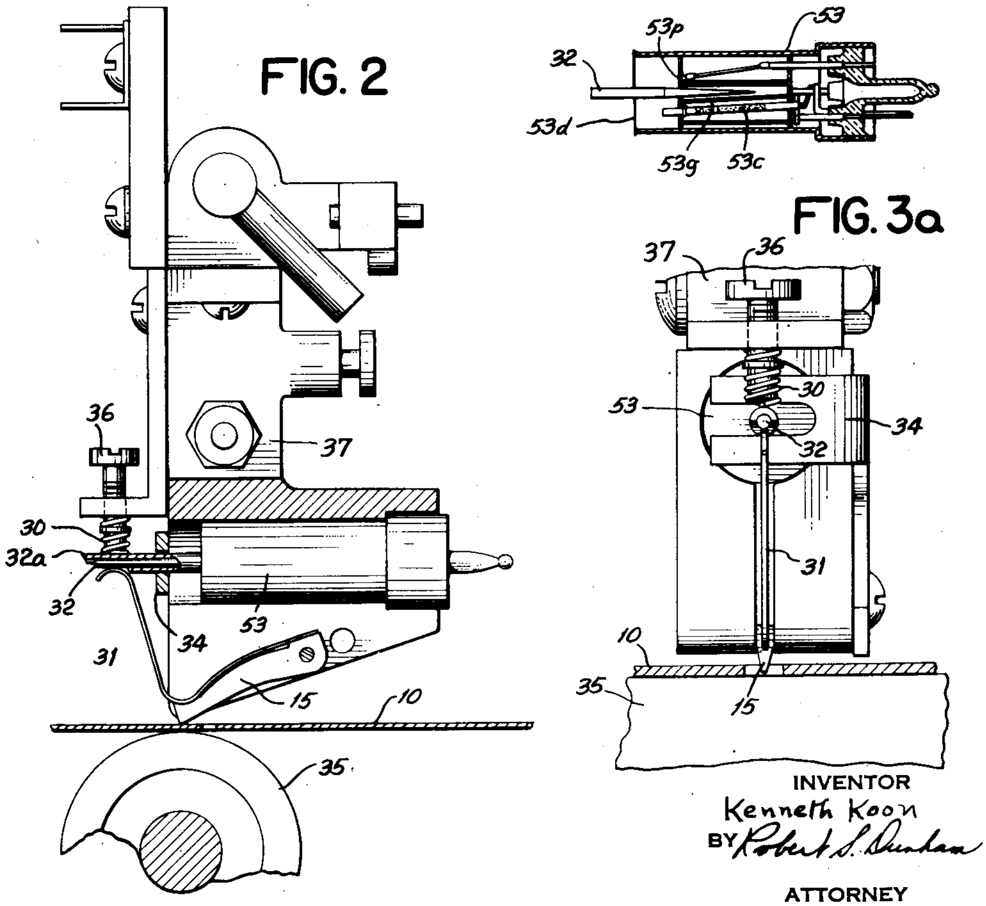
FIG. 2, FIG. 5, FIG. 3a
INVENTOR
Kenneth Koon
BY Robert S. Dunham
ATTORNEY

RECORD SENSING MEANS

Filed June 8, 1950 2 SHEETS—SHEET 2

INVENTOR.
Kenneth Koon
BY Robert S. Dunham
ATTORNEY.

Patented Jan. 22, 1952

2,583,179

UNITED STATES PATENT OFFICE 2,583,179

RECORD SENSING MEANS

Kenneth Koon, Johnson City, N. Y., assignor to International Business Machines Corporation, New York, N. Y., a corporation of New York Application June 8, 1950, Serial No. 166,821

3 Claims. (Cl. 235—61.11)

This invention relates to improvements in a record body sensing mechanism adapted for use in automatic electric accounting machines. It more particularly relates to a record body sensing mechanism in which an electron discharge device, the anode of which is displaceable relative to its cathode responsive to mechanical force, is substituted for the conventional brush and contact roll sensing means heretofore used in such machine.

My improved mechanism possesses advantages over the conventional brush and contact roll senser. A machine embodying the invention can sense record bodies in which the recorded data is represented by holes punched through the body, by depressions in the surfaces of the body, or by ridges on the surfaces of the body. It can also sense a succession of bodies containing the three types of index points intermingled. The recorded information, in the case of conventional punched cards, for example, is represented by holes punched completely through the cards, since control by such cards depends upon sensing a hole or index point by completing an electric circuit between the brush and the contact roll. This requires that the brush contact the roll through the card.

Another related advantage possessed by the invention is that depressions or ridges may be embossed on cards or other record bodies of thermoplastic material, the bodies may be analyzed by the novel sensing mechanism and then restored to their original unmarked condition by relieving the embossing strains as by the application of heat.

A further advantage of the invention is that the use of ridges or depressions will allow the storage of more information on a card of a given size than punched holes would accommodate. Furthermore, ridges or grooves may be readily formed by hand in the surface of record bodies, and such operation is at times desirable.

An important feature of the invention is a device for translating mechanical movement into electrical current in conjunction with a stylus which senses card holes, depressions and/or ridges. Such a device is the mechano-electronic transducer (RCA-5734), which is unique in the property that its anode is capable of being spacially displaced, relative to its cathode, by a mechanical force applied to an external extension of its anode. The anode displacement causes a change in the space charge distribution responsive in the invention to said depressions, holes or ridges, sensed by the stylus. Said change in turn causes a change in the anode current. This last change is made to control the firing of a gas tube, which in turn controls the operation of the accounting machine.

For the purpose of this specification the invention will be described in connection with a record-controlled card sorting machine of the type disclosed in United States Patent No. 1,741,985, granted December 31, 1929 to E. A. Ford. The use of the sensing mechanism herein renders sorters of this type as well as other automatic accounting machines capable of processing cards or other record bodies bearing depressions or ridges, as well as holes punched through the cards, or a plurality of such bodies bearing the three types of indices, or any two thereof, intermixed.

The above and other objects and advantages will appear more fully hereinafter from consideration of the following description taken in conjunction with the accompanying drawings in which:

Fig. 1 is a fragmentary elevation, partly in section, of a sorting machine embodying the invention;

Fig. 2 is an enlarged view, partly in section, of the mountings and biasing mechanism of the electronic transducer shown in Fig. 1;

Figure 4:
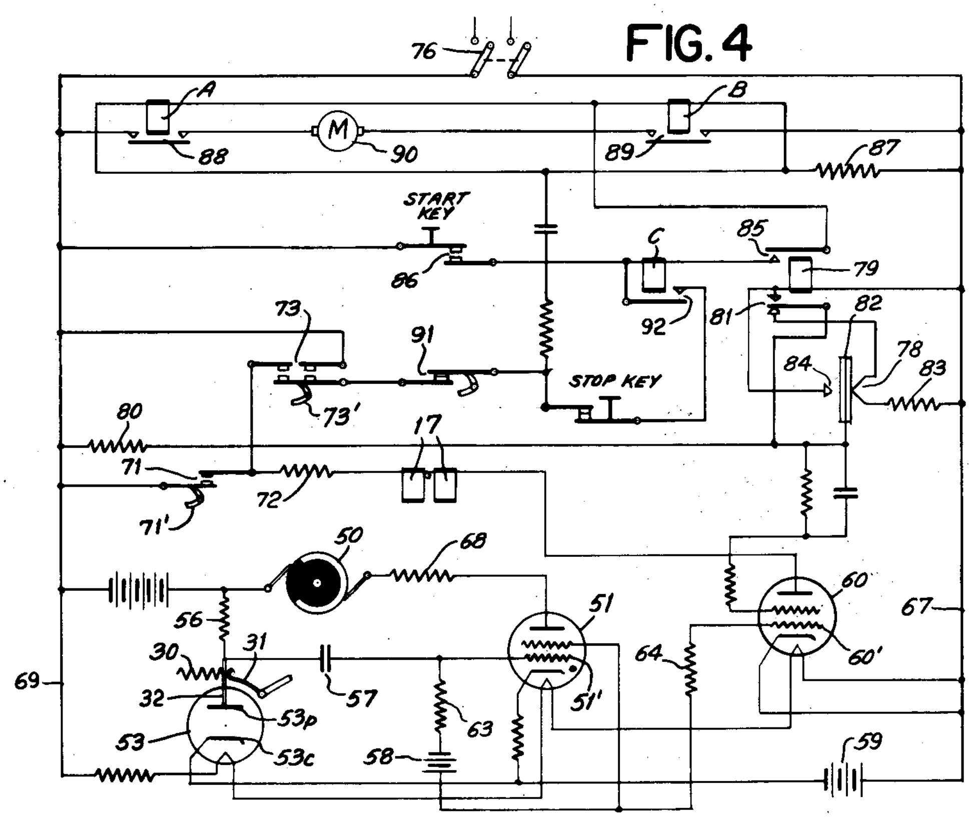
Figure 3B:
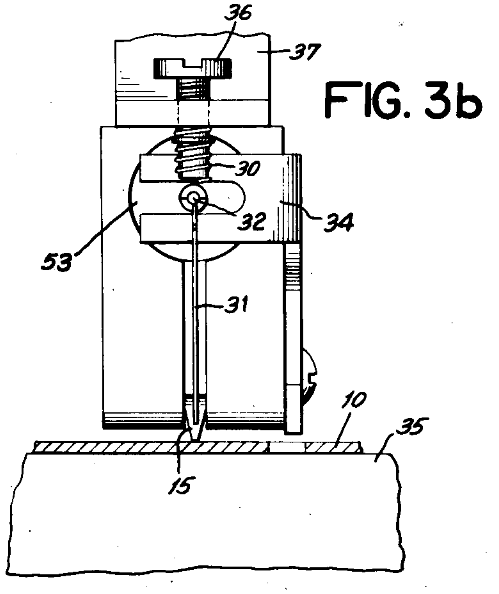
Figure 3C:
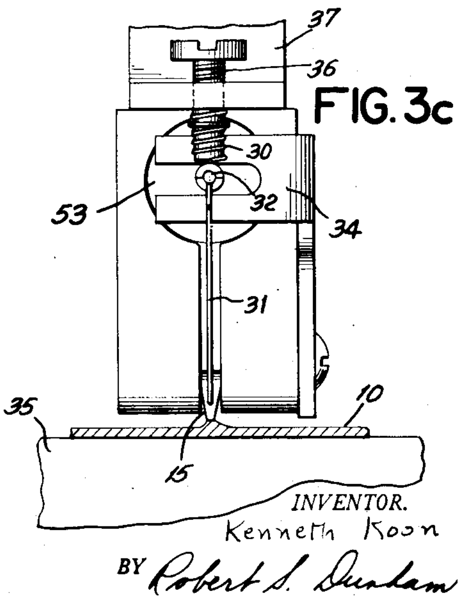

Fig. 3*a* is a front view of the biasing mechanism shown in Fig. 2, and a travel limit bracket in a particular setting;

Figs. 3*b* and 3*c* illustrate two other settings of the travel limit bracket;

Fig. 4 is a circuit diagram of the machine; and

Fig. 5 shows a longitudinal cross-section of a transducer (RCA-5734).

For the sake of clarity there follows a brief description of a record card sorting machine as modified by this invention, and its mode of operation. In Fig. 1 a stack of record cards 10 is placed in a magazine 11 from which a reciprocating picker mechanism 12 is adapted to advance the bottom card 10 of the stack to the left through a feed throat 13 in the bottom of the magazine 11. At this point, a pair of feed rollers 14 engage the card 10, one from beneath, and the other from above, and drive the card 10 past a sensing stylus 15 of the card sensing mechanism which includes a transducer 53 (see Fig. 2). Upon firing of the transducer 53 (to be described), a sorting magnet 17 will be energized, at which time an armature 18 associated therewith will be drawn downwardly toward the magnet 17. In Fig. 1 a card 10 is shown in contact with the stylus 15, with the left or leading edge partially overlapping the armature 18 and the right or trailing edge still between the feed rollers 14. The armature 18 has not been drawn downward toward the magnet 17, due to the latter not having been energized. When no card is in the position occupied by the card 10 in Fig. 1, the ends 19 of a plurality of flexible steel blades of different lengths and spring biased downward, rest on top of the armature 18. The space between every successive pair of blades leads to a different sorting pocket or station 20, of which only two are shown. If the magnet 17 is energized at a time when a card 10 is in the position shown in Fig. 1 due to the sensing of an index point by the stylus 15 and the transducer 53, the armature 18 is attracted downwardly, permitting the ends 19 of all the blades lying to the left of the leading edge of the card 10 to drop down with the armature 18. The remaining blades lying on top of the card 10 are held up by the card itself, so that continued movement of the card 10 will cause it to enter the passageway between a pair of blades 22 and 23. A card entering any such passageway will be conveyed by guide rollers 21 to the proper pocket 20. It is evident that the destination of each card depends on how far the card has traveled underneath the ends 19 of the blades at the instant the magnet 17 is energized, and that in turn depends on the location of the index point on that card by which the sorter is controlled.

The electric circuit of the machine is shown in Fig. 4, in which power is applied through a switch 76 to the lines 67 and 69. When switch 76 is closed, a time delay or heating element 78 and an associated relay 79 are operated as follows. Current flows from the line 69 through a resistor 80, through the contacts 81 of the relay 79, through the heating element 78, and through a resistor 83 to the line 67. In this condition, the heating element 78 heats a bimetallic strip 82, which, when it reaches a predetermined temperature, closes contacts 84, thus energizing the coil of relay 79. Under the influence of relay 79, the contacts 81 transfer, thus breaking the circuit through the heating element 78 and providing a hold circuit for relay coil 79. This hold circuit, once established, is effective until the main power switch 76 is opened. Also, contacts 85 are now closed under the influence of the relay 79, conditioning the start circuit.

Closure of a start key contact 86 by hand establishes the start circuit from the line 69, through the start contacts 86, a relay coil C, through the contacts 85, through starting relay coils A and B, which are connected in parallel, through a resistor 87 and thence to the line 67. Under the influence of the starting relay coils A and B, respectively, contacts 88 and 89 are closed, thus applying power to a motor 90, which drives the entire machine including the picker mechanism 12, the sensing roll and the various feed rolls.

To maintain the motor 90 in operation and allow the operator to release pressure from the start key 86 after cards are started feeding through the machine, and further, to stop the motor 90 after the passage of the last card, or in the event of a card jam, two card lever contacts or switch mechanisms 71 and 73 (Fig. 4) are provided. After a card 10 has passed the stylus 15 and before reaching the first pair of rollers 21, it depresses a card lever 71′ (Fig. 4) which is pivoted to the frame of the machine and which controls card contact 71. The purpose of the card lever contacts 71 and 73 is to maintain the motor 10 in operation following the release of the start key 86. This is accomplished by means of the following circuit. With a card depressing one, or both card levers 71′ and 73′, one or both card lever contacts 71 and 73 will be closed. This permits current to flow from the line 69 through either or both card lever contacts 71 and 73, through a card pocket contact 91, through stop key contacts, through a hold contact 92 of the relay C, the relay coil C, the contacts 85, the start relay coils A and B, in parallel, through the resistor 87 and thence to the line 67.

The action of an external extension or rod 32 and the anode of the transducer 53, under the urging of an operating leaf spring 31 (to be described), in altering the anode's spacial relationship with respect to the cathode of the transducer 53 varies the current flow through the tube and consequently the voltage drop, appearing across a load resistor 56, which may have a value in the neighborhood of 60,000 ohms, exhibits changes which are a function of the changes in the displacement from the zero-displacement position of the rod 32. These voltage changes are transmitted through a condenser 57 to a control grid 51′ of a gas tube 51, which may be a type 2050. If the voltage surge impressed on the control grid 51′ due to a change in the voltage drop across the resistor 56 is a positive one, the negative bias impressed on the brid 51′ by a battery 58 through a resistor 63 may be overcome, permitting the gas tube 51 to fire. If the voltage surge is in a negative direction, the negative bias impressed on the grid 51′ will be increased, and the status of the gas tube 51 will be unchanged, i. e. it will not fire.

During the periods of time when the tube 51 is non-conductive, the battery 59 also applies a negative bias to a control grid 60′ of a tube 60, which may be a type 25L6, through resistors 63 and 64, maintaining the tube 60 in a non-conducting state.

When the gas tube 51 fires, due to its control grid receiving a positive voltage pulse from the transducer 53, current flows from the line 69 through a timing commutator 50, through a resistor 68, through the gas tube 51, through the load resistor 63, through the battery 59 and thence to the line 67. This current flow drives the cathode of the gas tube 51 in a positive direction. Thus, the control grid 60′ of the tube 60 will also become more positive, the negative bias applied to the grid 60′ will be overcome, and the tube 60 will become conductive. With the tube 60 in this conducting condition, current will flow from the line 69, through the card lever contacts 71 and 73, through a resistor 72, through the coil 17 of the sorting magnet, and through the tube 60 to the line 67, thus energizing the sorting magnet coil 17 and operating the armature 18 (Fig. 1).

The electronic transducer 53 and its stylus 15 are shown mounted in a conventional sensing brush holder which had been modified to accommodate the transducer. A bias coil spring 30, and the operating leaf spring 31, balance their static pressures upon the transducer's anode deflection rod 32, the former from above and the latter from beneath. The force exerted from above by the bias spring 30 is made variable by means of a screw 36, in order to provide adjustment of the zero displacement condition of the rod 32.

The electronic transducer 53 is mounted horizontally in a holder 37, with its anode and the rod 32 shown to the left. The stylus 15 is pivotally mounted at the bottom edge of a continuation of the holder 37 extending vertically downward from the tube socket of the holder toward a pressure roll 35.

As a card 10 comes between the stylus 15 and the pressure roll 35, the stylus 15 is deflected from its normal resting position on the roll 35 and assumes a new position on the upper surface of the card 10. At this time, by conventional mechanical timing means, the commutator or circuit breaker 50 (Fig. 4) closes, establishing the plate circuit of the gas tube 51. The commutator 50 avoids a sensing of the leading edge of the card 10.

If now the stylus 15 encounters a hole through or depression or ridge in the card 10, either none or two deflections of the rod 32 are obtained, depending upon the setting of a travel limit bracket 34, shown in three different positions in Figs. 3*a*, 3*b* and 3*c*, respectively. The bracket 34 permits adjustment of the machine so that the tube 53 will sense ridges and not depressions or holes, or will sense both ridges and depressions or holes intermixed, or will sense depressions or holes and not ridges.

As the travel limit bracket 34 is shown in Fig. 3*a*, ridges will be sensed but not depressions or holes. With the stylus 15 riding on the upper surface of the card 10, the top edge of the bottom portion of the bracket 34 is tangential with the rod 32. Since the bracket 34 is held fast to the tube mounting, and cannot move, it will be evident that the rod 32 cannot be displaced downward. Thus, if the stylus 15 drops into a hole or depression, the rod 32 will remain stationary, even though the balance between the pressures exerted by the bias spring 30 and the operating spring 31 will be upset by a lessening of the latter. On the other hand, if the stylus 15 encounters a ridge, the rod 32 will receive an upward jolt, due to the increase in the pressure exerted on the rod 32 by the operating spring 31. A sensing will result.

As the travel limit bracket 34 is shown in Fig. 3*b*, both ridges and depressions or holes will be sensed, assuming that the shown setting corresponds to a condition in which the stylus 15 is riding on the surface of the card 10. It is evident that the rod 32 can move either up or down from its illustrated position, since it is in contact with neither jaw of the bracket 34. Thus if the stylus 15 encounters either a ridge or a hole or depression, the rod 15 will move either up or down, and a sensing will result.

As the travel limit bracket 34 is shown in Fig. 3*c*, holes or depressions will be sensed but not ridges, assuming again that the shown setting corresponds to a condition in which the stylus 15 is riding on the surface of the card 10. With this setting of the bracket 34, the rod 32 cannot be displaced upward, being prevented from moving in that direction because it is already tangential to the lower edge of the upper jaw of the bracket 34. Thus, if the stylus 15 encounters a ridge, no sensing will be obtained, but should it instead drop into a hole or depression, a sensing will result, for there is nothing to prevent the rod 32 from being displaced downward.

A guard 32*a* may be placed around the tip of the rod 32, so that the rod 32 will not be subjected to displacement from its normal position by more than ±0.5 degree. A larger displacement will distort the flexible metal diaphragm through which the rod 32 enters the transducer 53, and may damage the tube electrodes.

Fig. 5 shows an enlarged longitudinal cross section of the transducer 53 (RCA-5734). The rod 32 extends through the center of a thin flexible metal diaphragm 53*d*. Displacement of the rod 32 changes the distance between a fixed grid 53*g* (normally unbiased), its associated cathode 53*c*, and a plate 53*p* and results in a change in the plate current.

In the test circuit, the load resistor 56 had a value of 60,000 ohms, the gas tube 51 was a type 2050, and the tube 60 was a type 25L6. A change 0.2 ma. through the transducer (RCA-5734) caused a 12 volt change on grid of the tube 60, knocking down the grid bias and permitting the tube 60 to fire. The bias on the tube 60 could be varied from 2.6 volts to 9 volts without causing error in sorting.

With the stylus 15 on the surface of a card 10, a current of 1.8 ma. flowed through the transducer 53, but when it passed into a hole, the current decreased to 1.6 ma.; as explained above, this change was sufficient to fire the tube 51.

Dry batteries were used to supply plate voltage to the transducer 53 and to supply grid bias on the tube 51.

The operation of a sorting machine embodying the invention in brief is as follows:

When a card 10 bearing an index point (a hole or depression or a ridge) is driven past the stylus 15 by means of the picker mechanism 12 and the feed rollers 14, the stylus 15, on encountering the index point, will be deflected either up or down from its normal riding position on the surface of the card 10. Depending upon the setting of the travel limit bracket 34, the rod 32 may or may not be deflected in the same direction. If the rod 32 is so deflected, the anode 53*p* of the transducer 53 will alter its spacial relationship with the cathode 53*c*, thereby changing the space charge distribution within the transducer 53. This produces a change in the plate current of the transducer 53, which change is reflected by a change in the grid bias of the tube 51, thereby permitting that tube to fire. This firing, in turn, causes the tube 60 to assume a conducting status, thereby closing a circuit including the magnet 17, causing the magnet to draw its armature 18 in a downward direction. It is evident that the time when this happens is determined by the distance the card 10 has advanced when the transducer 53 senses the index point. The position of the card 10 also determines which pair of blades 19 the leading or left edge of the card 10 will be between when the magnet 17 is energized. When the armature 18 drops, the ends of the blades 23 to the left of the leading edge of the card 10 will also drop, the rest of the ends of the blades 23 being held up by the card 10 itself. Further driving of the card 10 by the rollers 21 will advance the card 10 between the selected pair of blades until the correct station 20 is reached.

The described machine will be seen to provide a sorter fulfilling the objects of the invention, but it is to be understood that the invention is not limited to the specific embodiment herein illustrated and described, but may be practiced in other ways without departure from its spirit as defined by the following claims.

What is claimed is:

1. In a device for sensing an index point on a record body, an electron discharge device having one electrode displaceable relative to the other in response to a varying mechanical force, a stylus adapted to contact the face of a record body and being mounted for movement in response to variations in the surface of such record body, means for transmitting mechanical movement from said stylus to the displaceable electrode of said electron discharge device, means for limiting the movement of said displaceable electrode in each of two opposite limit positions, and means for selectively adjusting said limiting means to adapt said device to sense either ridges or depressions on the face of a record body.

2. In a device for sensing an index point on a record body, an electron discharge device having a fixed cathode and an anode displaceable relative to said cathode in response to a varying mechanical force, an extension of said anode accessible externally of said discharge device, a stylus adapted to contact the face of a record body and being mounted for movement in response to variations in the surface of such record body, means for transmitting mechanical movement from said stylus to said anode of said electron discharge device, oppositely disposed spring devices operating on said extension for biasing the same to a neutral position, and adjustable means for limiting the movement of said anode in two opposite directions against the force of said spring devices.

3. In a device for sensing an index point on a record body, a sensing head, a socket in said head, an electron discharge device removably mounted in said socket, a fixed electrode in said discharge device, a second electrode in said discharge device displaceable relative to the fixed electrode in response to a varying mechanical force, an extension of said displaceable electrode accessible externally of said discharge device, a stylus adapted to contact the face of a record body and being mounted for movement in response to variations in the surface of such record body, means for transmitting mechanical movement from said stylus to the displaceable electrode of said electron discharge device, adjustable means for limiting the movement of said displaceable electrode in each of two opposite limit positions, and means for biasing said displaceable electrode to a neutral position between said limit positions.

KENNETH KOON.

REFERENCES CITED

The following references are of record in the file of this patent:

UNITED STATES PATENTS

| Number | Name | Date |
|---|---|---|
| 2,155,419 | Gunn | Apr. 25, 1939 |
| 2,302,081 | Weitmann | Nov. 17, 1942 |
| 2,460,726 | Arndt | Feb. 1, 1949 |